United States Patent
Venn et al.

(10) Patent No.: US 6,736,357 B2
(45) Date of Patent: May 18, 2004

(54) WRIST SUPPORT

(76) Inventors: Frederick W. Venn, 269 S. Brookside Ave., Freeport, NY (US) 11520; Walter Smart, 44 Colgate Rd., Atco, NJ (US) 08004

( * ) Notice: Subject to any disclaimer, the term of this patent is extended or adjusted under 35 U.S.C. 154(b) by 0 days.

(21) Appl. No.: 10/441,060

(22) Filed: May 20, 2003

(65) Prior Publication Data

US 2003/0192999 A1 Oct. 16, 2003

Related U.S. Application Data

(63) Continuation of application No. 09/618,798, filed on Jul. 18, 2000, now abandoned.
(60) Provisional application No. 60/210,824, filed on Jun. 12, 2000.

(51) Int. Cl.[7] .................................................. B60N 2/46
(52) U.S. Cl. ...................................................... 248/118
(58) Field of Search ............................... 248/118–118.5

(56) References Cited

U.S. PATENT DOCUMENTS

| | | |
|---|---|---|
| 237,459 A | 2/1881 | White |
| 1,706,634 A | 3/1929 | Seils |
| 1,885,750 A | 11/1932 | Miller, Jr. |
| RE19,721 E | 10/1935 | Genung |
| 2,491,009 A | 12/1949 | Lawrence |
| 2,766,463 A | 10/1956 | Bendersky |
| 3,124,328 A | 3/1964 | Kortsch |
| 3,304,035 A | 2/1967 | Davis |
| 4,332,263 A | 6/1982 | Kitrell |
| 4,907,835 A | 3/1990 | Salters |
| 4,913,393 A | 4/1990 | Wood |
| 4,997,054 A | 3/1991 | Denny et al. |
| 5,385,322 A | 1/1995 | Kim et al. |
| 5,713,591 A | 2/1998 | Zarkhin et al. |
| 5,971,549 A | 10/1999 | Cruickshank |
| 6,045,179 A | 4/2000 | Harrison |

*Primary Examiner*—Alvin Chin-Shue
(74) *Attorney, Agent, or Firm*—Shlesinger, Arkwright & Garvey LLP

(57) ABSTRACT

A wrist support comprises a bracket to be secured to a gear shift lever; a mounting rod secured to the bracket; a swivel secured to a free end of the rod; and a rest secured to the swivel. The rod is vertically and horizontally selectively adjustable with respect to the bracket. The bracket is angularly selectively adjustable with respect to the gear shift lever. The rest is rotatably movable and tiltable with respect to the rod.

14 Claims, 2 Drawing Sheets

WRIST SUPPORT

RELATED APPLICATIONS

This is a continuation of application Ser. No. 06/618,798, filed Jul. 18, 2000 now abandoned, which claims the prioriyt benefit of provisional application Ser. No. 60/210,824, filed Jun. 12, 2000, which is hereby incorporated by reference.

FIELD OF THE INVENTION

The present invention is directed to a wrist support for use in conjunction with a gearshift lever of a truck or other vehicles.

BACKGROUND OF THE INVENTION

While a truck driver is operating his vehicle it is necessary to shift gears to attain different rates of acceleration. Once the driver has achieved the desired speed, he/she will leave the gear shift in that position. It is common practice for the driver to rest his/her wrist on top of the gearshift knob, often for long periods of time. This practice usually causes discomfort to the driver's right wrist and/or hand when this is done repeatedly. A common hand/wrist ailment resulting from this practice is carpal tunnel syndrome, a condition usually requiring corrective surgery.

OBJECTS AND SUMMARY OF THE INVENTION

It is an object of the present invention to provide a wrist support adjacent to a gearshift lever to allow a driver to rest his/her right wrist comfortably while the vehicle remains in the same gear.

It is another object of the present invention to provide a wrist support that can be adjusted in a plurality of ways to provide the most comfortable position for the driver.

It is still another object of the present invention to provide a wrist support that can be retrofitted to a gearshift lever of a truck or other vehicle.

In summary, the present invention provides a wrist support comprising bracket to be secured to a gear shift lever; a mounting rod secured to the bracket; a swivel secured to a free end of the rod; and a rest secured to the swivel. The rod is vertically and horizontally selectively adjustable with respect to the bracket. The bracket is angularly selectively adjustable with respect to the gear shift lever. The rest is rotatably movable and tiltable with respect to the rod.

These and other objects of the present invention will become apparent from the following detailed description.

BRIEF DESCRIPTIONS OF THE DRAWINGS

DETAILED DESCRIPTION OF THE INVENTION

Figure 1:
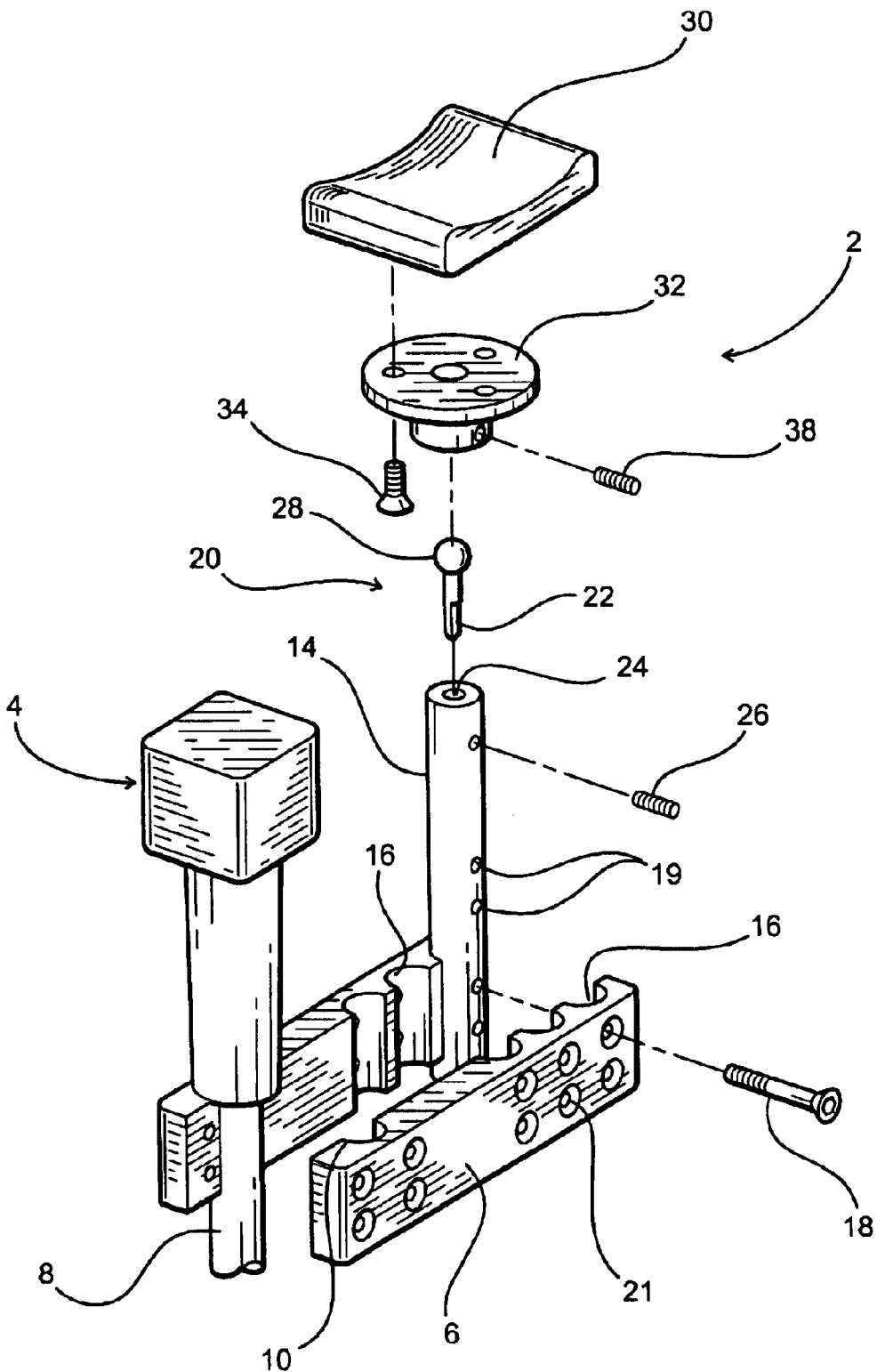
FIG. 1 is an exploded view of a wrist support made in accordance with the present invention.
Figure 2:
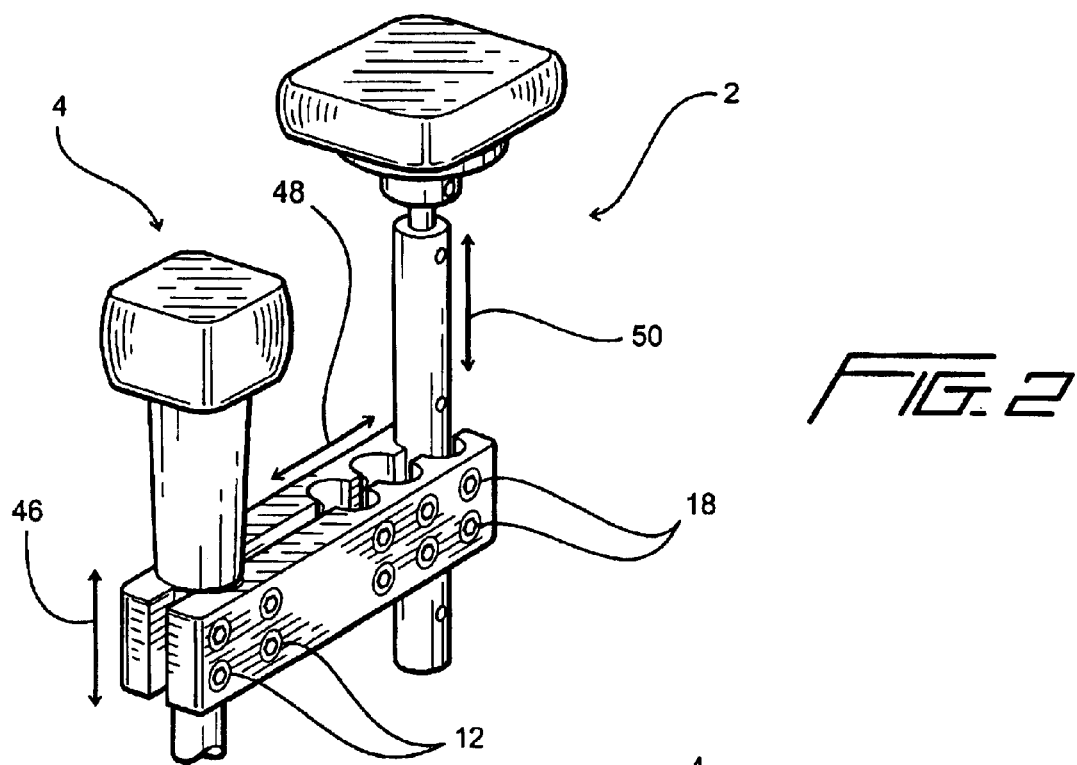
FIG. 2 is a perspective view of a wrist support of FIG. 1.

A wrist support 2 made in accordance invention is disclosed in FIG. 1. The support 2 is adapted to be secured to a gearshift lever 4 by means of a pair of members 6 which are clamped to a shaft 8 or other structure of the gearshift lever. The members 6 include complementary slots 10 adapted to fit around the shaft 8 with sufficient contact surfaces to make a stable installation. Screws 12 or other standard means are used to secure the members 6 to the shaft 8, as best shown in FIG. 2.

A mounting rod 14 is secured to another end of the members 6. A plurality of complementary slots 16 are adapted to receive the rod 14 in a clamping manner by means of screws 18 or other standard means. The rod 14 may be positioned closer or further away from the gearshift lever 4 by locating the rod 14 in one of the complementary slots 16.

A swivel 20 includes a shaft portion 22 received within an axial opening 24 at another end of the rod 14. A set screw 26 secures the swivel 20 to the rod 14. The swivel 20 includes a ball portion 28.

Figure 3:
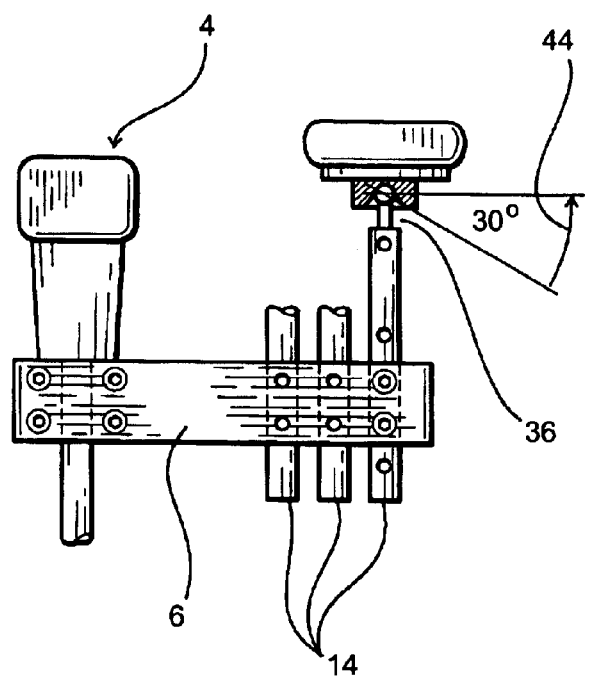
FIG. 3 is a side elevation view of FIG. 2, with portions shown in cross sections.

A rest 30 is secured to a swivel housing 32 by means of screws 34 or other suitable means. The housing 32 has a tapered opening 36, such as a frustum, to advantageously allow the rest 30 to be selectively tilted, preferably between 0°–30° from the horizontal, as best shown in FIG. 3. Three set screws 38 (only one shown for clarity), spaced 120° apart, secure the rest to the selected position.

The housing 32 is secured to the ball portion 28 by the three set screws 38.

Figure 4:
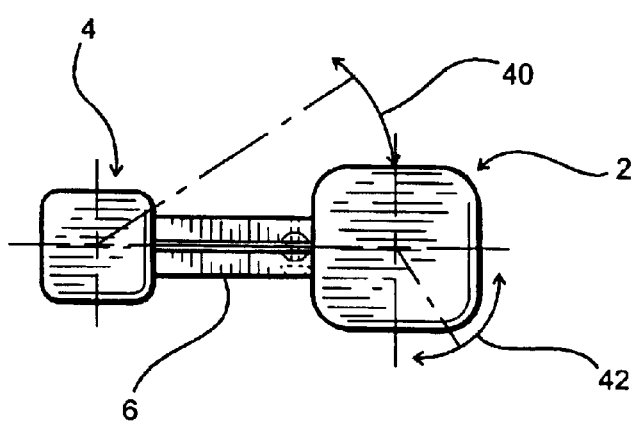
FIG. 4 is a top plan view of FIG. 2.

To adjust the wrist support 2 in the most comfortable position for the user, multiple adjustments are provided. The support 2 may be adjusted vertically relative to the gearshift lever 4 by loosening the screws 12 (see FIG. 2) to loosen the clamping pressure provided by the members 6 around the shaft 8 and sliding the assembly 2 up or down the shaft. At the same time, the support 2 may be rotated about the shaft 8 to any position around a complete circle as indicated by the arrow 40 (see FIG. 4). The screws 12 are then re-tightened when the desired position is achieved. The support 2 may be brought closer or farther to the gearshift lever 4 by positioning the mounting rod 14 in one of the complementary slots 16. The rest 30 may be further adjusted vertically while the members 6 remain stationary by removing the screws 18 and moving the mounting rod 14 upwardly or downwardly by aligning any of the plurality of holes 19 with the respective holes 21. Further adjustments to the rest 30 is provided by loosening the set screws 38 and rotating the rest 30 through any position in a complete circle, as indicated by the arrow 42 (see FIG. 4) while at the same time inclining or tilting the rest 30 to any position within a 300 angle as indicated by the arrow 44. The set screws 38 are then tightened to lock the position selected for the rest 30. It will therefore be understood that the support 2 may be adjusted in six different ways, each one being independent from the others. These adjustment are indicated by the arrows 40, 42, 44, 46, 48 and 50, as best shown in FIGS. 2, 3 and 4.

Although the wrist support is contemplated for use in commercial trucks with floor mounted gearshift levers, it could also be used with any type of vehicle requiring a wrist support for comfortable operation. The rest 30 is disclosed in FIG. 1 as being contoured to take advantage of the multiple adjustments available in adjusting the rest in the right orientation most comfortable for the user. The rest 30 may also be plain, as best shown in FIG. 2.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A wrist support and gear shift lever combination, comprising:
   a) bracket secured to said gear shift lever;
   b) vertical mounting rod secured to said bracket;
   c) swivel secured to a free end of said rod;
   d) wrist rest secured to said swivel to provide support to a drivers wrist;
   e) said bracket including a plurality of holes arranged along its longitudinal axis;
   f) said rod including a plurality of holes along its longitudinal axis;
   g) any one of said rod holes is adapted to be aligned to one of said bracket holes to provide lateral and vertical adjustment to said wrist rest; and
   h) a bolt is receivable through said aligned holes.

2. The combination as in claim 1, wherein said wrist rest is contoured.

3. The combination as in claim 1, wherein said bracket is angularly selectively adjustable with respect to said gear shift lever.

4. A wrist support as in claim 1, wherein said wrist rest is rotatably movable with respect to said rod.

5. The combination as in claim 1, wherein said bracket includes first and second members joined to said rod and said gear shift level in a clamping manner.

6. The combination as in claim 1, wherein said wrist rest is selectively movable 360° about a vertical axis.

7. The combination as in claim 1, wherein said wrist rest is selectively movable about 30° about any horizontal axis passing through said swivel.

8. A wrist support and gear shift lever combination, comprising:
   a) horizontally extending bracket secured to said gear shift lever, said bracket being selectively vertically adjustable with respect to said gear shift lever;
   b) vertical mounting rod secured to said bracket, said mounting rod being selectively vertically adjustable with respect to said bracket;
   c) a wrist rest operably secured to one end of said mounting rod;
   d) said mounting rod being selectively laterally adjustable along a length of said bracket; and
   e) said bracket including first and second members joined to said in a clamping manner.

9. The combination as in claim as in claim 8, wherein said bracket is selectively rotatably adjustable with respect to said gear shift lever.

10. The combination as in claim 8, wherein said wrist rest is selectively rotatably adjustable about a vertical axis.

11. The combination as in claim 10, and further comprising a swivel operably secured to said mounting rod and said wrist rest such that said wrist rest is selectively rotatably adjustable about a vertical axis.

12. The combination as in claim 10, and further comprising a swivel assembly operably secured to said mounting rod and said wrist rest such that said wrist rest is selectively adjustably inclinable from a horizontal plane.

13. The combination as in claim 12, wherein:
   a) said swivel assembly includes a housing secured to said wrist rest;
   b) a swivel including a shaft portion secured to said mounting rod;
   c) said swivel including a ball portion received within a tapered opening within said housing to allow said rest to be inclined from a horizontal plane; and
   d) set screw operably secured to said housing to apply pressure to said ball portion to maintain said wrist rest in a desired orientation.

14. A wrist support and gear shift lever combination, comprising:
   a) bracket secured to said gear shift lever;
   b) a swivel assembly operably secured to said bracket, said swivel assembly including a mounting rod;
   c) a wrist rest operably secured to said swivel assembly;
   d) said swivel assembly including a housing secured to said wrist rest and said mounting rod;
   e) said swivel assembly including a swivel including a shaft portion secured to said mounting rod;
   f) said swivel including a ball portion received within a tapered opening within said housing to allow said wrist rest to be inclined from a horizontal plane; and
   g) set screw operably secured to said housing to apply pressure to said ball portion to maintain said wrist rest in a desired orientation.

* * * * *